United States Patent

Wakiguchi et al.

(10) Patent No.: US 12,504,961 B2
(45) Date of Patent: Dec. 23, 2025

(54) ELECTRONIC CONTROL SYSTEM FOR VEHICLE FIRMWARE

(71) Applicants: DENSO CORPORATION, Kariya (JP); TOYOTA JIDOSHA KABUSHIKI KAISHA, Toyota (JP)

(72) Inventors: Kotaro Wakiguchi, Kariya (JP); Koji Hashimoto, Nagoya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 17/980,593

(22) Filed: Nov. 4, 2022

(65) Prior Publication Data

US 2023/0143921 A1    May 11, 2023

(30) Foreign Application Priority Data

Nov. 10, 2021  (JP) .................. 2021-183409

(51) Int. Cl.
*G06F 9/44*     (2018.01)
*G06F 8/65*     (2018.01)

(52) U.S. Cl.
CPC ...................... *G06F 8/65* (2013.01)

(58) Field of Classification Search
CPC ........................................... G06F 8/65
See application file for complete search history.

(56) References Cited

U.S. PATENT DOCUMENTS

| 2006/0059375 A1* | 3/2006 | Ooshima ............... H04L 9/0894 713/193 |
| 2006/0259207 A1* | 11/2006 | Natsume .................. G06F 8/65 701/1 |
| 2012/0042307 A1* | 2/2012 | Shao ....................... G06F 8/654 717/168 |

(Continued)

FOREIGN PATENT DOCUMENTS

| JP | 2020-027624 A | 2/2020 |
| JP | 2020-027628 A | 2/2020 |

OTHER PUBLICATIONS

AUTOSAR, Specification of Update and Configuration Management, AUTOSAR AP R19-11, dated Nov. 28, 2019, pp. 1-122.

(Continued)

*Primary Examiner* — Hang Pan
(74) *Attorney, Agent, or Firm* — Harness, Dickey & Pierce, P.L.C.

(57) ABSTRACT

An electronic control system includes: a master controller that: receives an update program and an update information file including information related to a program update; and transfers the update information file and the update program; a sub-controller that: writes an update program into a first memory; and receives the update information file and the update program from the master controller; and a specific update execution unit that: stores specific update information related to a program update for a second memory; and writes an update program into the second memory. The sub-controller controls the specific update execution unit to write, according to the specific update information, an update program of a firmware into the second memory when the update information file indicates that the program update includes an update of the firmware.

14 Claims, 8 Drawing Sheets

(56) References Cited

U.S. PATENT DOCUMENTS

| | | | |
|---|---|---|---|
| 2020/0050378 A1 | 2/2020 | Sakurai et al. | |
| 2020/0050442 A1 | 2/2020 | Sakurai et al. | |
| 2020/0183676 A1 | 6/2020 | Sakurai et al. | |
| 2020/0241771 A1 | 7/2020 | Sakurai et al. | |
| 2021/0081144 A1* | 3/2021 | Kobuki | G06F 3/0659 |
| 2021/0155176 A1 | 5/2021 | Harata et al. | |
| 2021/0155177 A1 | 5/2021 | Harata et al. | |
| 2021/0157529 A1 | 5/2021 | Sakurai et al. | |
| 2021/0157566 A1 | 5/2021 | Sakurai et al. | |
| 2021/0157567 A1 | 5/2021 | Sakurai et al. | |
| 2021/0157568 A1 | 5/2021 | Sakurai et al. | |
| 2021/0157571 A1 | 5/2021 | Ogawa et al. | |
| 2021/0157572 A1 | 5/2021 | Harata et al. | |
| 2021/0157575 A1 | 5/2021 | Ogawa et al. | |
| 2021/0157902 A1 | 5/2021 | Sakurai et al. | |
| 2022/0012043 A1 | 1/2022 | Sakurai et al. | |

OTHER PUBLICATIONS

AUTOSAR, Explanation of Adaptive Platform Design, AUTOSAR AP R19-11, dated Nov. 28, 2019, pp. 1-84.

* cited by examiner

| Name | ActionType | |
|---|---|---|
| Kind | TYPE_REFERENCE | |
| Derived from | `uint8_t` | |
| Description | Represents the UCM action. | |
| Range / Symbol | Limit | Description |
| kUpdate | 0x00 | Update of a SoftwareCluster. |
| kInstall | 0x01 | Installation of a new SoftwareCluster. |
| kRemove | 0x02 | Removal of a SoftwareCluster. |

| Name | ActionType | |
|---|---|---|
| Kind | TYPE_REFERENCE | |
| Derived from | uint8_t | |
| Description | Represents the UCM action. | |
| Range / Symbol | Limit | Description |
| kUpdate | 0x00 | Update of a SoftwareCluster. |
| kInstall | 0x01 | Installation of a new SoftwareCluster. |
| kRemove | 0x02 | Removal of a SoftwareCluster. |
| kFirmware Update | 0x03 | Update of a Firmware. |

ELECTRONIC CONTROL SYSTEM FOR VEHICLE FIRMWARE

CROSS REFERENCE TO RELATED APPLICATION

The present application claims the benefit of priority from Japanese Patent Application No. 2021-183409 filed on Nov. 10, 2021. The entire disclosure of the above application is incorporated herein by reference.

TECHNICAL FIELD

The present disclosure relates to an electronic control system including a master controller, a sub-controller that writes an update program into a memory in response to receiving an instruction from this master controller, a storage medium storing a data structure used in this system and a storage medium storing a computer program used in this system.

BACKGROUND

In recent years, the scale of application programs for vehicle control, diagnosis, and the like, installed in an electronic control system (hereinafter, referred to as an ECU (Electronic Control Unit)) of a vehicle, has been increased due to the diversification of vehicle control such as a driving support function and an autonomous driving function. In addition, with the version upgrade to improve functions and the like, the opportunity to rewrite (reprogram) application programs of the ECUs is also increasing. On the other hand, a technique for connected cars has also spreads together with the progress of communication networks or the like. Under such circumstances, in a comparative example, update programs for ECUs have been communicated from a server through OTA (Over The Air) to rewrite programs of the ECUs at the vehicle.

SUMMARY

An electronic control system includes: a master controller that: receives an update program and an update information file including information related to a program update; and transfers the update information file and the update program; a sub-controller that: writes an update program into a first memory; and receives the update information file and the update program from the master controller; and a specific update execution unit that: stores specific update information related to a program update for a second memory; and writes an update program into the second memory. The sub-controller controls the specific update execution unit to write, according to the specific update information, an update program of a firmware into the second memory when the update information file indicates that the program update includes an update of the firmware.

DETAILED DESCRIPTION

Figure 1:
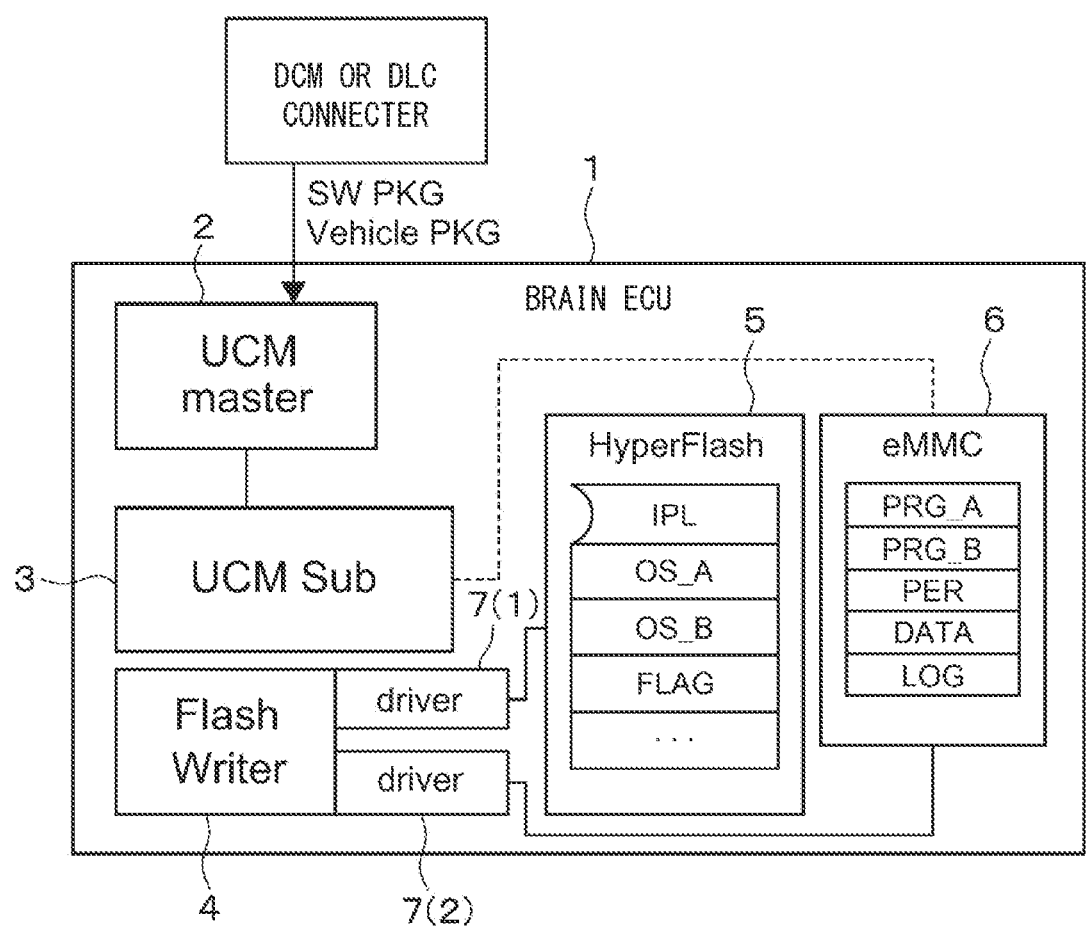
FIG. 1 is a functional block diagram showing a brain ECU configuration according to one embodiment.

Methods for rewriting the update program described above include a storage method, in which the entire update program is downloaded from a center device to a memory of a vehicle and thereafter an update is executed, and a streaming method, in which the update is executed while the update program is being downloaded from the center device to the memory of the vehicle. In addition, regarding a package structure for distributing the update program according to a platform of an ECU, specifications of JASPAR (Japan Automotive Software Platform and Architecture) define data requirements applicable to a Classic Platform (CP) operating on a static OS of AUTOSAR (AUTomotive Open System ARchitecture). The JASPAR is a general incorporated association, and the AUTOSAR is a standards body. Further, the AUTOSAR defines data requirements applicable to a new type of adaptive platform (AP) operating on a dynamic OS.

Furthermore, R20-11 of AUTOSAR defines specifications of UCM (Update and Configuration Management) having a function of software update in an AP type ECU, but does not define an update of a firmware. The firmware is usually written into a flash memory. However, how the firmware is arranged in the memory differs depending on an OEM (Original Equipment Manufacturer), a vehicle type, and an ECU type. When the firmware is updated, it is necessary to consider a location of the firmware in the memory or a memory address. Further, when a memory has a double-bank configuration, it is necessary to consider a position of a flag indicating an active area, operation at the time of start, and operation after the update. It is not desirable to update the firmware by excluding the UCM function because it increases the cost.

The present disclosure provides an electronic control system capable of updating a firmware by using functions of a master controller and a sub-controller, a data structure of software package in this system, and a computer program in this system.

According to one example, an electronic control system may include: a master controller that: may receive an update program and an update information file including information related to a program update; and may transfer the update information file and the update program; a sub-controller may write an update program into a first memory in response to receiving an instruction from the master controller; and may receive the update information file and the update program from the master controller; and a specific update execution unit that: may store, in advance, specific update information related to a program update for a second memory; and may write an update program into the second memory in response to receiving an instruction from the sub-controller.

The sub-controller may control the specific update execution unit to write, according to the specific update information, an update program of a firmware into the second memory when the update information file may indicate that the program update includes an update of the firmware. In such a manner, the sub-controller controls the specific update execution unit, and thereby it is possible to cause the specific update execution unit to write the update program of the firmware into the second memory. Accordingly, when the functions of the master controller and the sub-controller are defined as specifications, it is possible to update the firmware by using the functions and also adding the function of the specific update execution unit.

In the electronic control system, the second memory may include two banks for the firmware and a storage area for a boot flag. The boot flag may indicate one of the two banks as an active area. In response to receiving the instruction from the sub-controller, the specific update execution unit may: identify, according to the specific update information and the boot flag indicating the one of the two banks as the active area, the other one of the two banks as a write target area in the second memory; write the update program into the identified write target area after canceling the boot flag from the storage area, and set, in the storage area, the boot flag indicating the other one of the two banks as the active area after completing writing the update program into the write target area. With such a control, during the process for writing a program into one bank, the other bank is an active area. Thus, even when the write into the one bank fails in the middle, it is possible to start the firmware written in the other bank.

According to another embodiment, a non-transitory tangible computer readable storage medium may store a data structure of a software package that may be read and executed by a sub-controller in an electronic control system. The system may include: a master controller; the sub-controller that may write an update program into a first memory in response to receiving an instruction from the master controller; and a specific update execution unit that may write an update program into a second memory in response to receiving an instruction from the sub-controller. The specific update execution unit may store, in advance, specific update information related to a program update for the second memory. The master controller may be an UCM (Update and Configuration Management) Master defined in specifications of AUTOSAR (AUTomotive Open System ARchitecture). The sub-controller may be an UCMSubordinate defined in the specifications. The software package may be a software package defined in the specifications. The data structure may include: an update program for a firmware; and a software package manifest. When the software package manifest may include an update instruction for the firmware, the UCMSubordinate may control the specific update execution unit to write, according to the specific update information, the update program for the firmware into the second memory.

Further, according to another embodiment, a non-transitory tangible computer readable storage medium may be used for an electronic control system. The system may include: a computer; a master controller; a sub-controller that may write an update program into a first memory in response to receiving an instruction from the master controller; and a specific update execution unit that may write an update program into a second memory in response to receiving an instruction from the sub-controller. The specific update execution unit may store, in advance, specific update information related to a program update for the second memory. The medium may store a computer program comprising instructions configured to, when executed by the computer, cause the computer to: control the master controller to transfer an update information file including information related to a program update and an update program to the sub-controller upon receiving the update program and the update information file; and cause the sub-controller to control the specific update execution unit to write, according to the specific update information, an update program of a firmware into the second memory when the update information file indicates that the program update includes an update of the firmware.

Hereinafter, an embodiment will be described. As shown in FIG. 1, a brain ECU 1 mounted on a vehicle includes: an UCM master unit 2 that is one example of a master controller; an UCM sub unit 3 that is one example of a sub-controller, a flash writer 4; a HyperFlash (registered trademark) 5 that is one example of a second memory; and an eMMC (embedded Multi Media Card) 6 that is one example of a first memory. In the specifications of AUTOSAR, the UCM master unit 2 corresponds to an UCM (Update and Configuration Management) Master, and the UCM sub unit 3 corresponds to an UCM Subordinate. Further, the UCM master unit 2 and the UCM sub unit 3 are software update applications. The HyperFlash 5 and the eMMC 6 are flash memories.

The UCM master unit 2 manages the entire processing related to a program update, and receives data packages related to the program update via a DLC connector for a wired communication or a DCM (Data Communication Module) that constitutes an OTA master together with the UCM master unit 2. The UCM master unit 2 is connected to at least one UCM sub unit 3. The UCM master unit 2 identifies the UCM sub unit 3 that should receive an instruction related to the program update, and gives an instruction to the UCM sub unit 3.

The UCM sub unit 3 is placed in each of ECUs mounted on the vehicle. The functions are in compliance with functions defined in the AUTOSAR. However, in the present embodiment, some functions are added. The UCM sub unit 3 writes an application program into the eMMC 6 when the application program is updated.

The flash writer 4 is one example of a specific update execution unit, and is a memory controller that receives an instruction from the UCM sub unit 3 and executes write into the HyperFlash 5 and the eMMC 6. Therefore, information indicating memory maps of the HyperFlash 5 and the eMMC 6 are written into the flash writer 4 in advance. The information corresponds to specific update information. The flash writer 4 deletes or writes data of the HyperFlash 5 or the eMMC 6 according to a physical address indicated by each memory map.

The flash writer 4 accesses the HyperFlash 5 and the eMMC 6 via drivers 7 (1) and 7 (2) respectively. The flash writer 4 writes a program of the firmware into the HyperFlash 5 when the firmware is updated. The UCM master unit 2, the UCM sub unit 3, and the flash writer 4 are functional blocks mainly provided by software of a computer constituting an ECU.

Each of the HyperFlash 5 and the eMMC 6 has a double-bank structure including two areas (also referred to as two banks) into which a program is written. These areas are referred to as a bank-A and a bank-B. An OS_A and an OS_B in the HyperFlash 5 are respectively the bank-A and the bank-B into which firmware are written. A FLAG is a boot flag indicating whether an active area of the firmware is the bank-A or the bank-B. An IPL (Initial Program Loader) reads the FLAG, identifies the active area, and starts either the OS_A or the OS_B.

A PRG_A and a PRG_B of the eMMC 6 correspond to a bank-A and a bank-B, respectively, into which an application program is written. The bank-A of the HyperFlash 5 and the bank-A of the eMMC 6 start in conjunction with each other. Similarly, the bank-B of the HyperFlash 5 and the bank-B of the eMMC 6 start in conjunction with each other. In addition, a LOG, data, a PER indicating a partition mode, or the like are written into the eMMC 6.

Figure 2:
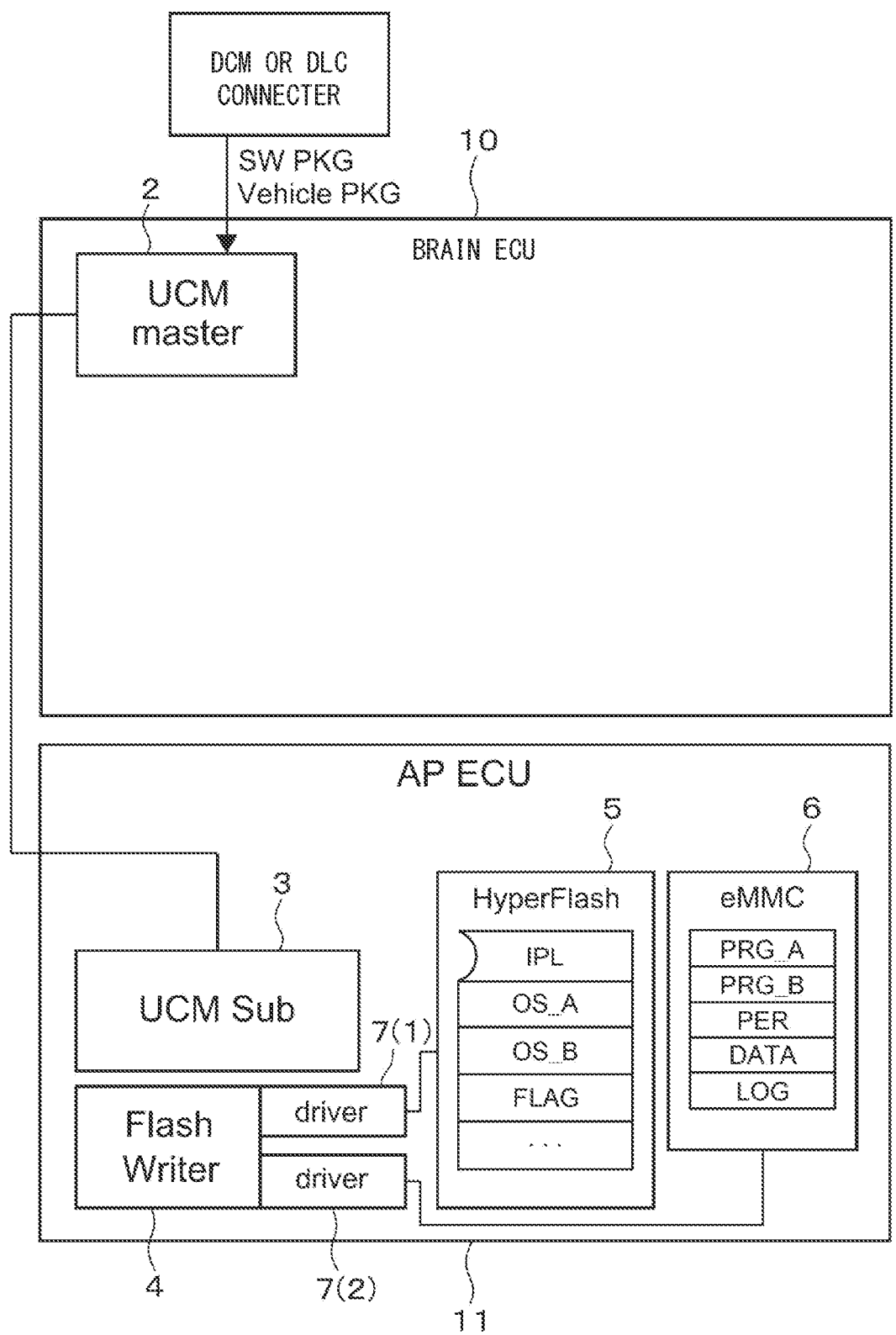
FIG. 2 is a functional block diagram showing configurations of the brain ECU and a target ECU.

FIG. 2 shows a case where a brain ECU 10 includes only the UCM master unit 2, and the other components are placed in a target ECU 11. In a case of FIG. 1, a brain ECU 1 corresponds to a control system. However, in the case of FIG. 2, the brain ECU 10 and the target ECU 11 correspond to the control system.

Figures 3, 4:
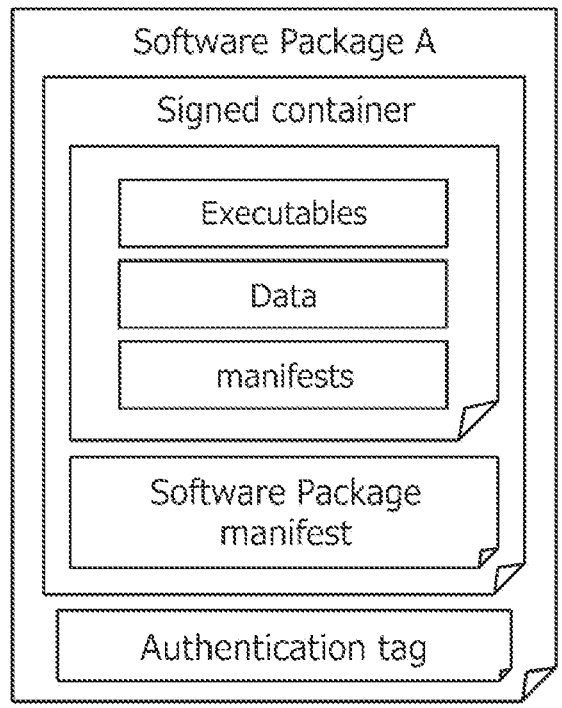
FIG. 3 is a diagram showing a software package.
FIG. 4 is a diagram showing an action type in a software package manifest.

FIG. 3 shows a software package defined in the AUTOSAR. When the UCM sub unit 3 receives the software package via the UCM master unit 2, action types that are items in the software package manifest shown in FIG. 4 are referred. In FIG. 4, as the action types, kUpdate, kInstall, and kRemove are defined. The software package manifest is one example of an update information file.

Figures 5, 6:
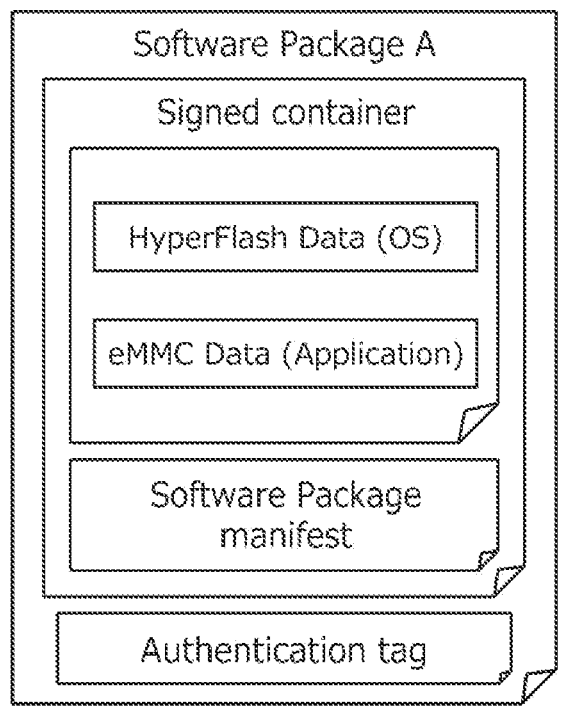
FIG. 5 is diagram showing a software package for a firmware update in a present embodiment.
FIG. 6 is a diagram showing an action type in the software package manifest in the present embodiment.

In the present embodiment, as shown in FIG. 5, the software package for a firmware update includes firmware update data written into the HyperFlash 5 and application program update data written into the eMMC 6. As the action type, a kFirmwareUpdate indicating a firmware update is added, as shown in FIG. 6.

Figure 7:
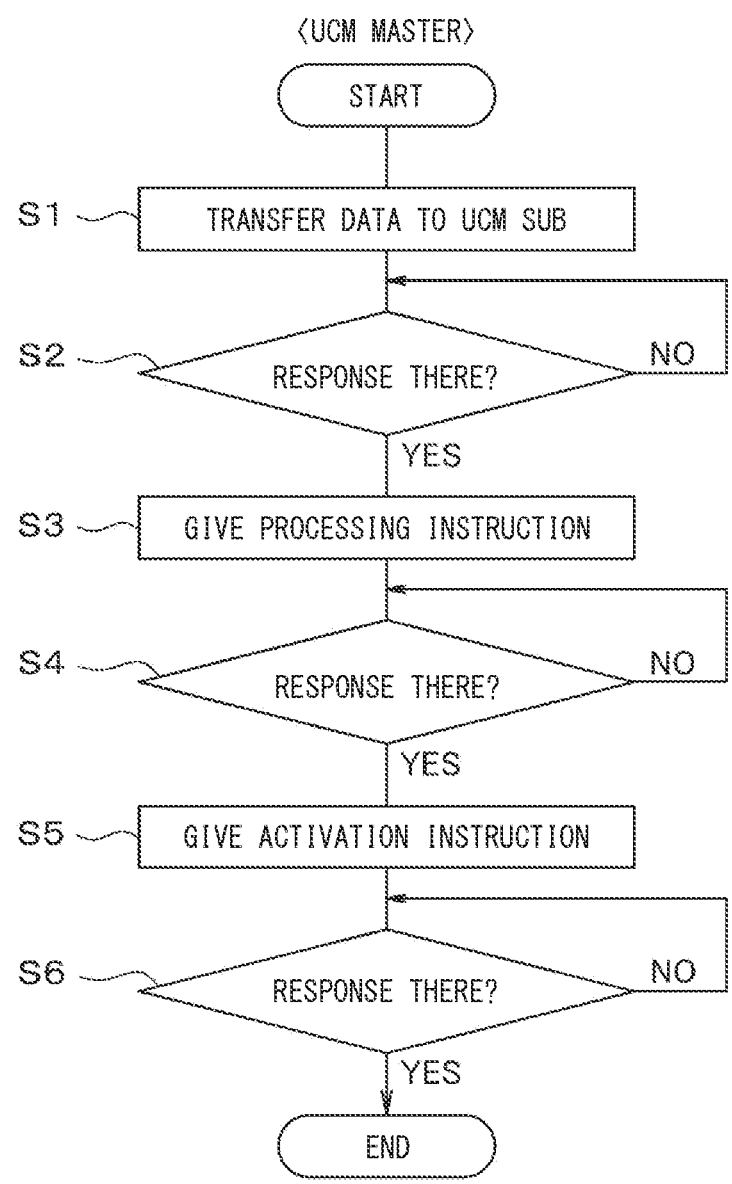
FIG. 7 is a flowchart showing process contents of an UCM master unit.

Next, an operation of the present embodiment will be described. As shown in FIG. 7, the UCM master unit 2 transfers the software package to the UCM sub unit 3 upon receiving the software package that is data for program update via the DCM or the DLC connector (S1). When there is a response to the transfer from the UCM sub unit 3 (S2; YES), the UCM master unit 2 instructs the UCM sub unit 3 to execute processing, that is, install the update program (S3). When there is a response to the processing from the UCM sub unit 3 (S4; YES), the UCM master unit 2 instructs the UCM sub unit 3 to activate, that is, validate the update program (S5). When there is a response to the processing from the UCM sub unit 3 (S6; YES), the process ends.

Figure 8:
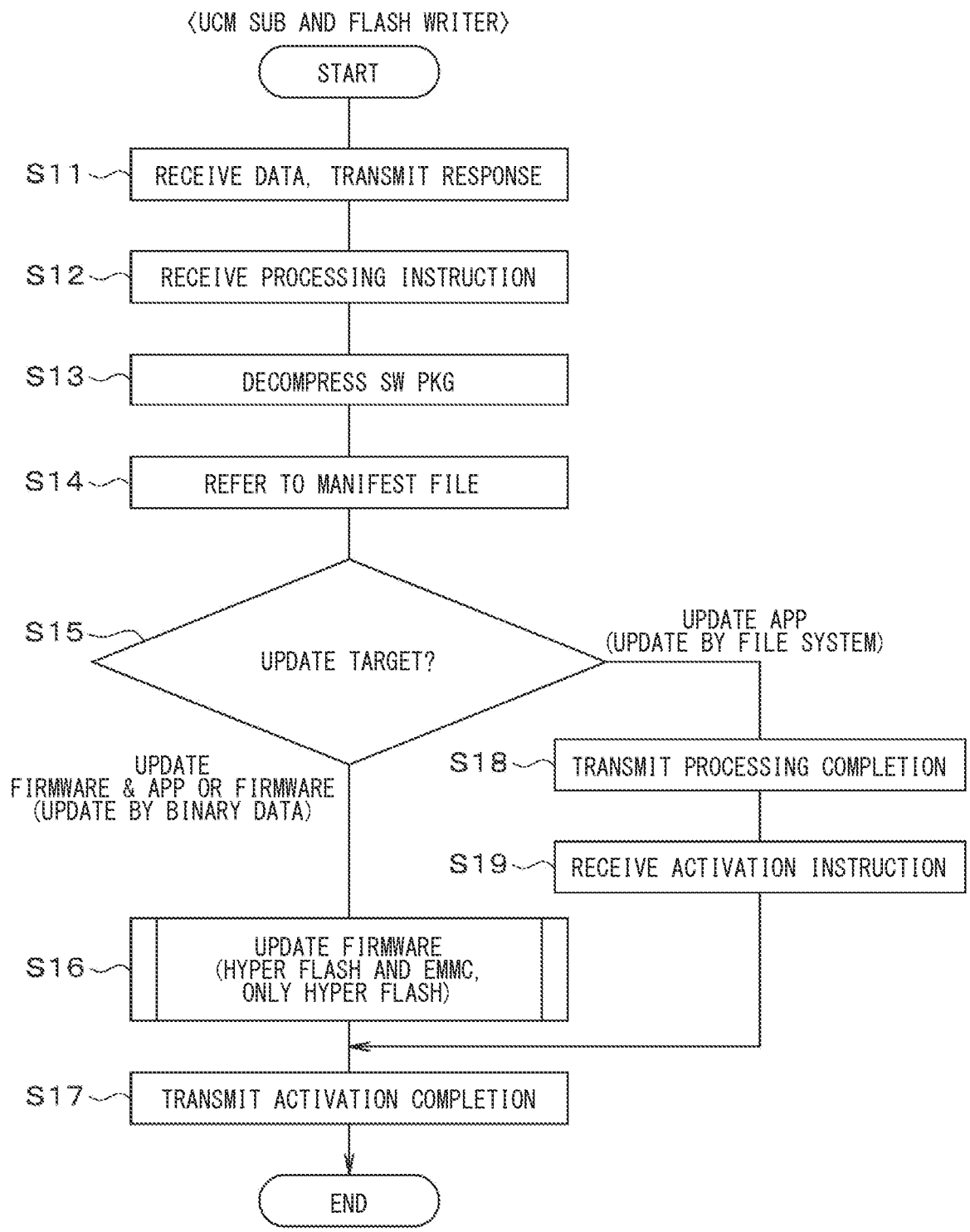
FIG. 8 is a flowchart mainly showing process contents of an UCM sub unit.

As shown in FIG. 8, upon receiving the software package, the UCM sub unit 3 transmits a response to the UCM master unit 2 (S11). Next, when receiving the processing instruction (S12), the UCM sub unit 5 decompresses a compressed software package (S13), and refers to a manifest file (S14). The UCM sub unit 3 confirms an update target and an update method (S15). When the update target is an application program, the UCM sub unit 3 writes, according to the defined file system, an update program of the application into the eMMC 6. Upon completing the processing, the UCM sub unit 3 transmits a completion response to the UCM master unit 2 (S18). Next, upon receiving an activation instruction (S19), the UCM sub unit 3 executes activation. Upon completing the activation, the UCM sub unit 3 transmits a completion response to the UCM master unit 2 (S17).

On the other hand, in S15, when the update target includes the firmware, only the firmware is updated based on binary data or both of the firmware and the application program are updated (S16).

Figure 9:
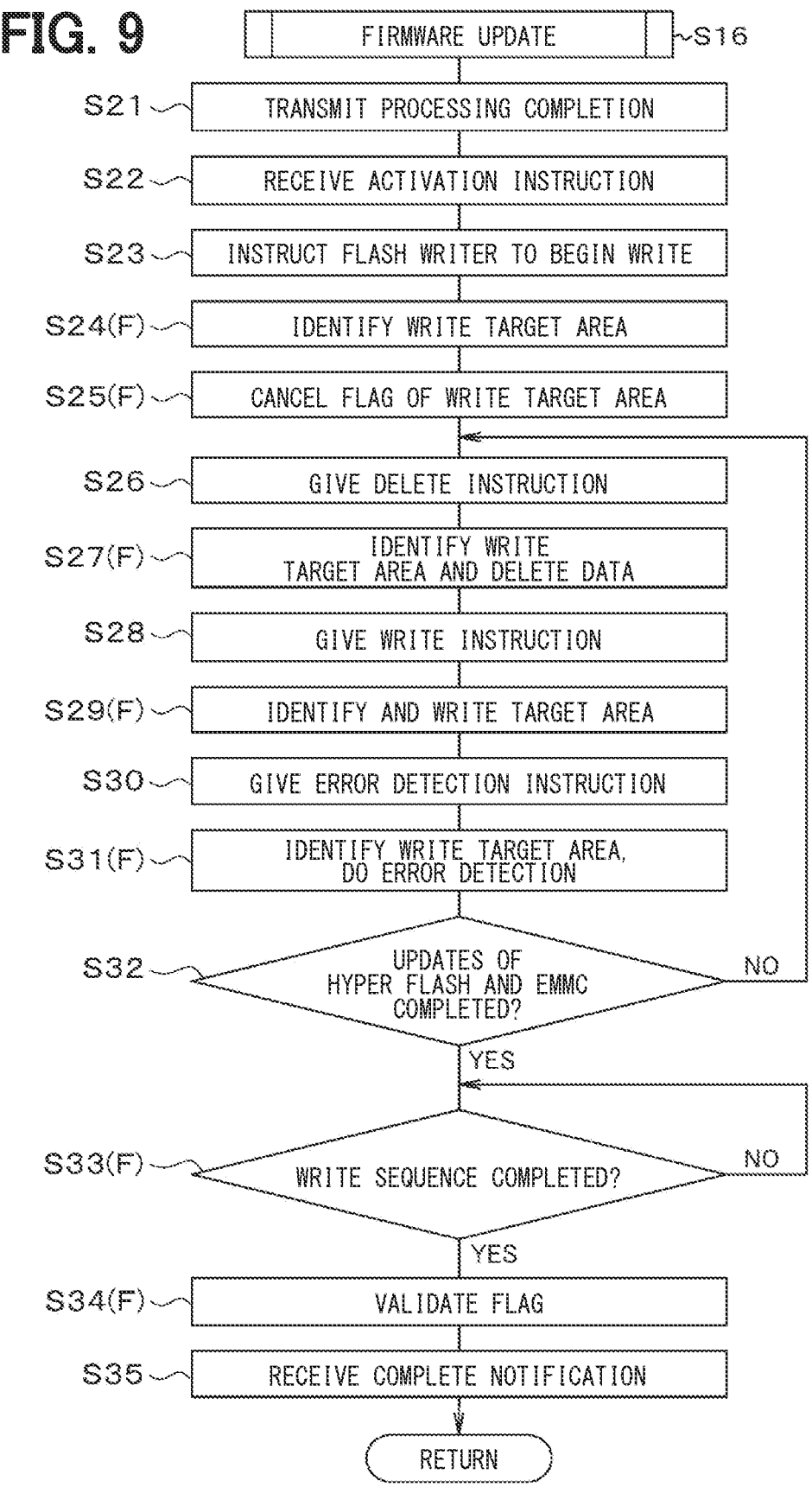
FIG. 9 is a flowchart mainly showing process contents of a flash writer.

As shown in FIG. 9, in a firmware update process, the UCM sub unit 3 transmit the processing completion response to the UCM master unit 2 (S21). Next, upon receiving an activation instruction (S22), the UCM sub unit 3 instructs the flash writer 4 to start the write (S23). In FIG. 9, "(F)" is attached to processes executed by the flash writer 4.

When identifying a write target area by referring to the FLAG of the HyperFlash 5 (S24), the flash writer 4 cancels the FLAG indicating the write target area. Next, when the UCM sub unit 3 instructs the flash writer 4 to delete, for example, a program stored in the write target area (S26), the flash writer 4 identifies the write target area and deletes the program (S27). Next, when the UCM sub unit 3 instructs the flash writer 4 to execute writing into the write target area (S28), the flash writer 4 identifies the write target area and executes the writing to the target area (S29). Next, when the UCM sub unit 3 instructs the flash writer 4 to execute error detection on the write target area (S30), the flash writer 4 identifies the write target area and executes the error detection on the write target area (S31).

When the update of the HyperFlash 5 has not ended or the updates of the HyperFlash 5 and the eMMC 6 have not ended (S32; NO), the process returns to S26. When the update ends or when the updates end (YES) and also the writing sequence is completed (S33; YES), the FLAG of the write target area is validated (S34). When the UCM sub unit 3 receives a completion notification of the update process from the flash writer 4 (S35), the process ends and returns.

In the processes described above, FLAG cancellation (that is, reset of FLAG) and FLAG validation (that is, setting of FLAG) are as follows. For example, when the FLAG is 1 bit data, it is assumed that "0" indicates the bank-A and "1" indicates the bank-B. In this case, when the FLAG is 0 (FLAG=0), that is, indicates the bank-A, cancelling the FLAG means setting the FLAG to 1 (FLAG=1) which is the inverse of 0. On the contrary, when the FLAG is 1 (FLAG=1), that is, indicates the bank-B, cancelling the FLAG means setting the FLAG to 0 (FLAG=0) which is the inverse of 1.

Figure 10:
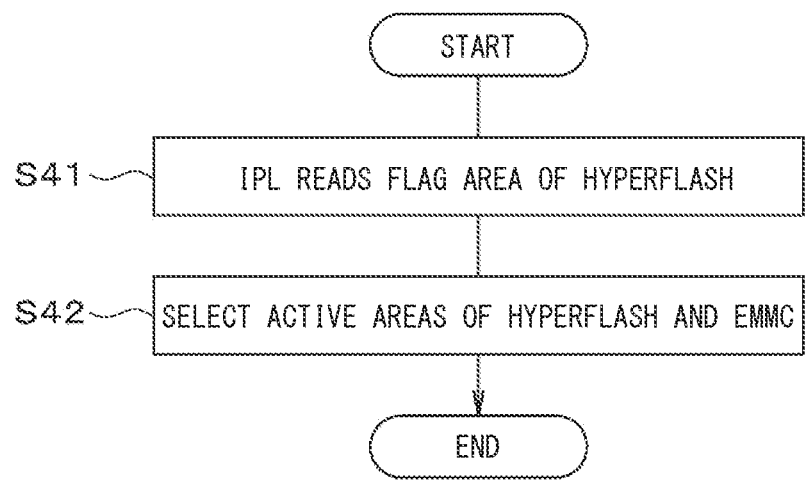
FIG. 10 is a flowchart schematically showing processes executed by an IPL at a normal start.

As shown in FIG. 10, at a normal start, the IPL reads a FLAG area of the HyperFlash 5 (S41) to select active areas of the HyperFlash 5 and the eMMC 6 (S42).

As described above, according to the present embodiment, the UCM sub unit 3 writes the update program into the eMMC 6 in response to receiving the instruction from the UCM master unit 2. The flash writer 4 writes the update program into the HyperFlash 5 in response to receiving the instruction from the UCM sub unit 3. The flash writer 4 stores, in advance, a memory map of the HyperFlash 5. Upon receiving the software package, the UCM master unit 2 transfers the package to the UCM sub unit 3.

The UCM sub unit 3 controls the update processing of the program based on information of the software package manifest in the package described above. When the update includes an update for the firmware, the UCM sub unit 3 controls the flash writer 4 to write, according to the memory map, the update program of the firmware into the HyperFlash 5. In such a manner, the UCM sub unit 3 controls the flash writer 4, and thereby it is possible to write the update program of the firmware into the HyperFlash 5. Therefore, it is possible to update the firmware by using the functions defined in specifications for the UCM master unit 2 and the UCM sub unit 3 and also adding the function of the flash writer 4.

Also, the HyperFlash 5 includes two write target areas as the bank-A and the bank-B, and a storage area for the FLAG indicating one of the two banks as an active area (also referred to as a booting area). In response to receiving a write beginning instruction from the UCM sub unit 3, the flash writer 4 identifies, according to the memory map, the write target area of the HyperFlash 5, and resets the FLAG indicating the write target area. After that, the flash writer 4 starts the write. After completion of the write, the flash writer 4 sets the FLAG. In other words, in response to receiving the instruction from the UCM sub unit 3, the flash writer 4 identifies, according to the memory map and a FLAG indicating one of the two banks as an active area (booting area), the other one of the two banks as a write target area in the HyperFlash 5, writes the update program into the identified write target area after canceling the FLAG from the storage area, and sets, in the storage area, the FLAG indicating the other one of the two banks as the booting area after completing the write of the update program into the write target area.

Thereby, during the writing process into one area, the other bank is being an active area. Thus, even when the write into the one bank fails in the middle, it is possible to start the program written in the other bank. In addition, when receiving the instruction for deleting the program in the write target area from the UCM sub unit 3 before the beginning of the write, the flash writer 4 deletes the program of the write target area. Therefore, it is possible to write the update program into the target area corresponding to the deleted program.

Further, when the update includes an update of the application program, the UCM sub unit 3 writes the application program into the eMMC 6. Therefore, it is possible to also use the function of the UCM sub unit 3.

Other Embodiments

Multiple target ECUs 11 may be provided. The function for the flash writer 4 to write the program into the eMMC 6 may be provided as required. The second and first memories are not limited to HyperFlash 5 and eMMC 6, respectively.

While the present disclosure has been described with reference to embodiments thereof, it is to be understood that the disclosure is not limited to the embodiments and constructions. The present disclosure incorporates various modifications and variations within the scope of equivalents. Furthermore, various combination and formation, and other combination and formation including one, more than one or less than one element may be made in the present disclosure.

Means and/or functions provided by each device or the like may be provided by software recorded in a substantive memory device and a computer that can execute the software, software only, hardware only, or some combination of them. For example, if the control system is provided by an electronic circuit that is hardware, the control system may be provided by a digital circuit or an analog circuit that includes a large number of logic circuits.

The controllers (control units) and method described in the present disclosure may be implemented by a special purpose computer which is configured with a memory and a processor programmed to execute one or more particular functions embodied in computer programs of the memory. Alternatively, the controllers (control units) described in the present disclosure and the method thereof may be realized by a dedicated computer configured as a processor with one or more dedicated hardware logic circuits. Alternatively, the controllers (control units) and the method according to the present disclosure may be achieved using one or more dedicated computers constituted by a combination of the processor and the memory programmed to execute one or more functions and the processor with one or more hardware logic circuits. The computer programs may be stored, as instructions to be executed by a computer, in a non-transitory tangible computer-readable storage medium.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

The invention claimed is:

1. An electronic control system, comprising:
at least one processor; and
a memory storing instructions that, when executed by the processor, configure the processor to implement:
a master controller configured to:
 receive an update program and an update information file including information related to a program update; and
 transfer the update information file and the update program;
a sub-controller configured to:
 write an update program into a first memory, which is a non-volatile memory, in response to receiving an instruction from the master controller; and
 receive the update information file and the update program from the master controller; and
a specific update execution unit configured to:
 store, in advance, specific update information related to a program update for a second memory, which is a non-volatile memory, the specific update information including a memory map showing a physical address of the first memory and a memory map showing a physical address of the second memory; and
 write an update program into the second memory in response to receiving an instruction from the sub-controller,
wherein
the sub-controller controls a program update according to the update information file;
the update information file specifies any one of kUpdate, kInstall, kRemove, or kFirmwareUpdate;
the sub-controller reads the update information file and determines which of kUpdate, kInstall, kRemove, or kFirmwareUpdate is specified;
when the update information file specifies kUpdate, the sub-controller writes the update program into the first memory, and does not instruct the specific update execution unit to write into the second memory;
when the update information file specifies kFirmwareUpdate, the sub-controller instructs the specific update execution unit to write the update program into the second memory at the physical address shown in the memory map of the second memory, and does not write the update program into the first memory; and
the information specified by kUpdate and kFirmwareUpdate are different, kUpdate being associated with application program update to the first memory, kFirmwareUpdate being associated with firmware update.

2. The electronic control system according to claim 1, wherein
the second memory includes two banks for the firmware and a storage area for a boot flag,
the boot flag indicates one of the two banks as an active area,
the specific update execution unit is configured to, in response to receiving the instruction from the sub-controller:
 identify, according to the specific update information and the boot flag indicating the one of the two banks as the active area, the other one of the two banks as a write target area in the second memory;

write the update program into the identified write target area after canceling the boot flag from the storage area, and set, in the storage area, the boot flag indicating the other one of the two banks as the active area after completing writing the update program into the write target area.

3. The electronic control system according to claim 2, wherein the specific update execution unit is configured to delete a program currently stored in the write target area, upon receiving a program delete instruction from the sub-controller before starting the writing.

4. The electronic control system according to claim 1, wherein the sub-controller is configured to write an application program into the first memory when the update information file indicates the program update includes an update of the application program.

5. The electronic control system according to claim 1, wherein the master controller is a software update application in compliance with an UCM (Update and Configuration Management) Master defined in specifications of AUTOSAR (AUTomotive Open System ARchitecture), and the sub-controller is a software update application in compliance with an UCMSubordinate defined in the specifications.

6. The electronic control system according to claim 5, wherein the update information file is included in a software package defined in the specifications.

7. The electronic control system according to claim 1, wherein the update information file specifies defines one of kUpdate, kInstall, kRemove as defined in AUTOSAR, and kFirmwareUpdate as an action type.

8. The electronic control system according to claim 1, further comprising:

the first memory that is an embedded MultiMediaCard in which a NAND flash memory and a memory controller are integrated; and the second memory that is a NOR flash memory.

9. A non-transitory tangible computer readable storage medium storing a data structure of a software package that is read and executed by a sub-controller in an electronic control system, the system including:

a master controller;

the sub-controller configured to write an update program into a first memory, which is a non-volatile memory, in response to receiving an instruction from the master controller, and to receive an update information file from the master controller; and a specific update execution unit configured to write an update program into a second memory in response to receiving an instruction from the sub-controller, wherein the specific update execution unit is configured to store, in advance, specific update information related to a program update for the second memory, which is a non-volatile memory, the specific update information including a memory map showing a physical address of the first memory and a memory map showing a physical address of the second memory, the master controller is an UCM (Update and Configuration Management) Master defined in specifications of AUTOSAR (AUTomotive Open System ARchitecture), the sub-controller is an UCMSubordinate defined in the specifications, the software package is a software package defined in the specifications, the data structure comprising:

an update program for a firmware; and a software package manifest, wherein:

the update information file specifies any one of kUpdate, kInstall, kRemove, or kFirmwareUpdate;

the sub-controller reads the update information file and determines which of kUpdate, kInstall, kRemove, or kFirmwareUpdate is specified;

when the update information file specifies kUpdate, the sub-controller writes the update program into the first memory, and does not instruct the specific update execution unit to write into the second memory;

when the update information file specifies kFirmwareUpdate, the sub-controller instructs the specific update execution unit to write the update program into the second memory at the physical address shown in the memory map of the second memory, and does not write the update program into the first memory; and the information specified by kUpdate and kFirmwareUpdate are different, kUpdate being associated with application program update to the first memory, kFirmwareUpdate being associated with firmware update.

10. The non-transitory tangible computer readable storage medium according to claim 9, wherein the data structure further includes an update program for an application, when the software package manifest includes an update instruction for the application, the UCMSubordinate is configured to write the update program for the application into the first memory.

11. A non-transitory tangible computer readable storage medium for an electronic control system, the system including:

a computer;

a master controller;

a sub-controller configured to write an update program into a first memory, which is a non-volatile memory, in response to receiving an instruction from the master controller; and a specific update execution unit configured to write an update program into a second memory in response to receiving an instruction from the sub-controller, wherein the specific update execution unit is configured to store, in advance, specific update information related to a program update for the second memory, which is a non-volatile memory, the specific update information including a memory map showing a physical address of the first memory and a memory map showing a physical address of the second memory, the medium stores a computer program comprising instructions configured to, when executed by the computer, cause the computer to:

control the master controller to transfer an update information file including information related to a program update and an update program to the sub-controller upon receiving the update program and the update information file;

wherein:

the update information file specifies any one of kUpdate, kInstall, kRemove, or kFirmwareUpdate;

the sub-controller reads the update information file and determines which of kUpdate, kInstall, kRemove, or kFirmwareUpdate is specified;

when the update information file specifies kUpdate, the sub-controller writes the update program into the first memory, and does not instruct the specific update execution unit to write into the second memory;

when the update information file specifies kFirmwareUpdate, the sub-controller instructs the specific update execution unit to write the update program into the second memory at the physical address shown in the memory map of the second memory, and does not write the update program into the first memory; and the information specified by kUpdate and kFirmwareUpdate are different, kUpdate being associated with application program update to the first memory, kFirmwareUpdate being associated with firmware update.

12. The non-transitory tangible computer readable storage medium according to claim 11, wherein the second memory includes two banks for the firmware and a storage area for a boot flag, the boot flag indicates one of the two banks as an active area, the computer program further comprises an instruction causing the computer to control the specific update execution unit to, when the specific update execution unit receives the instruction from the sub-controller:

identify, according to the specific update information and the boot flag indicating the one of the two banks as the active area, the other one of the two banks as a write target area in the second memory;

write the update program into the identified write target area after canceling the boot flag from the storage area, and set, in the storage area, the boot flag indicating the other one of the two banks as the active area after completing writing the update program into the write target area.

13. The non-transitory computer readable medium according to claim 12, wherein the program further comprises an instruction causing the computer to control the specific update execution unit to delete a program currently stored in the write target area, when the specific update execution unit receives a program delete instruction from the sub-controller before starting the writing.

14. The non-transitory computer readable medium according to claim 11, wherein the computer program further comprises an instruction causing the computer to control the sub-controller to write an application program into the first memory when the update information file indicates the program update includes an update of the application program.

* * * * *